US011431617B2

(12) United States Patent
Nainar et al.

(10) Patent No.: US 11,431,617 B2
(45) Date of Patent: Aug. 30, 2022

(54) OPERATIONS, ADMINISTRATION, AND MANAGEMENT/MAINTENANCE RESPONSE REPLICATION

(71) Applicant: Cisco Technology, Inc., San Jose, CA (US)

(72) Inventors: Nagendra Kumar Nainar, Morrisville, NC (US); Carlos M. Pignataro, Cary, NC (US); Reshad Rahman, Ottawa (CA); Pascal Thubert, Roquefort les Pins (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 24 days.

(21) Appl. No.: 15/930,803

(22) Filed: May 13, 2020

(65) Prior Publication Data
US 2021/0359932 A1 Nov. 18, 2021

(51) Int. Cl.
G06F 15/16 (2006.01)
H04L 45/00 (2022.01)
H04L 43/10 (2022.01)

(52) U.S. Cl.
CPC ............ H04L 45/22 (2013.01); H04L 43/10 (2013.01)

(58) Field of Classification Search
CPC ......... H04L 45/22; H04L 45/24; H04L 45/10; H04L 45/026; H04L 43/10
See application file for complete search history.

(56) References Cited

U.S. PATENT DOCUMENTS

| 7,567,563 | B2 | 7/2009 | Marce et al. |
| 8,125,907 | B2* | 2/2012 | Averi ................... H04L 45/123 370/232 |
| 8,804,719 | B2 | 8/2014 | Aldrin et al. |
| 9,444,675 | B2 | 9/2016 | Guichard et al. |
| 9,979,515 | B2 | 5/2018 | Mirsky et al. |
| 2020/0344151 | A1* | 10/2020 | Joseph ................. H04L 45/741 |

(Continued)

OTHER PUBLICATIONS

Chen, "Return Path Specified Label Switched Path (LSP) Ping", 2014.*

(Continued)

Primary Examiner — Jeffrey R Swearingen
Assistant Examiner — Messeret F Gebre
(74) Attorney, Agent, or Firm — Edell, Shapiro & Finnan, LLC

(57) ABSTRACT

In one example, a responder obtains an Operations, Administration, and Management/Maintenance (OAM) probe packet from a network entity operating as an initiator in a network, provides, to the initiator, a first response to the OAM probe packet over a first network path in the network, and further provides, to the initiator, a second response to the OAM probe packet over a second network path in the network that is different from the first network path. In another example, an initiator provides an OAM probe packet to a network entity operating as responder in a network, obtains, from the responder, a first response to the OAM probe packet over a first network path in the network, and further obtains, from the responder, a second response to the OAM probe packet over a second network path in the network that is different from the first network path.

20 Claims, 12 Drawing Sheets

(56) References Cited

U.S. PATENT DOCUMENTS

2021/0168066 A1* 6/2021 Arvidson .............. H04W 40/02

OTHER PUBLICATIONS

Kamil, "Tracetree: A Utility to Discover Multicast Tree Topology in the Network", 2002.*
Akiya, "Label Switched Path (LSP) Ping and Traceroute Reply Mode Simplification", 2014.*
Jonathan Rodriguez, "Small Cells for 5G Mobile Networks," in Fundamentals of 5G Mobile Networks , Wiley, 2014, doi: 10.1002/9781118867464.ch3, p. 63-104. (Year: 2014).*
D. Sabella et al., "Energy Efficiency Benefits of RAN-as-a-Service Concept for a Cloud-Based 5G Mobile Network Infrastructure," in IEEE Access, vol. 2, 2014, doi: 10.1109/ACCESS.2014.2381215, p. 1586-1597. (Year: 2014).*
B. Bangerter, S. Talwar, R. Arefi and K. Stewart, "Networks and devices for the 5G era," in IEEE Communications Magazine, vol. 52, No. 2, Feb. 2014, doi: 10.1109/MCOM.2014.6736748, p. 90-96. (Year: 2014).*
Q. C. Li, H. Niu, A. T. Papathanassiou and G. Wu, "5G Network Capacity: Key Elements and Technologies," in IEEE Vehicular Technology Magazine, vol. 9, No. 1, Mar. 2014, doi: 10.1109/MVT.2013.2295070, p. 71-78. (Year: 2014).*
Pier Luigi Ventre et al., "Segment Routing: a Comprehensive Survey of Research Activities, Standardization Efforts and Implementation Results", arxiv.org, IEEE Communications, v04, Jan. 25, 2020, 36 pages.
Hallstein Lohne et al., "Mechanisms for OAM on MPLS in large IP backbone networks", Agder University College, May 2002, 87 pages.
G. Mirsky et al., "Bidirectional Forwarding Detection (BFD) Directed Return Path", draft-ietf-mpls-bfd-directed-12, MPLS Working Group, Aug. 21, 2019, 8 pages.
G. Mirsky et al., "Bidirectional Forwarding Detection (BFD) Directed Return Path", draft-ietf-mpls-bfd-directed-11, MPLS Working Group, Apr. 3, 2019, 8 pages.
R. Geib, Ed. et al., "Use case for a scalable and topology aware MPLS data plane monitoring system", draft-geib-segment-routing-oam-usecase-00, Feb. 5, 2014, 10 pages.
J. Postel et al., "Internet Control Message Protocol", Darpa Internet Program Protocol Specification, Network Working Group, Request for Comments (RFC) 792, Sep. 1981, 21 pages.
R. Geib, Ed. et al., "A Scalable and Topology-Aware MPLS Data-Plane Monitoring System", Internet Engineering Task Force (IETF) Request for Comments (RFC) 8403, Jul. 2018, 19 pages.
K. Kompella et al., "Detecting Multiprotocol Label Switched (MPLS) Data-Plane Failures", Internet Engineering Task Force (IETF) Request for Comments (RFC) 8029, Mar. 2017, 78 pages.
Clarence Filsfils, "Flexible Algorithm makes Segment Routing Traffic Engineering even more agile", Cisco blogs, Jan. 25, 2018, 7 pages.
Cisco, "Cisco Nexus 9000 Series NX-OS SRv6 Configuration Guide, Release 9.3(x)", Cisco, Jan. 15, 2020, 32 pages.
P. Psenak, Ed. et al., "IGP Flexible Algorithm", draft-ietf-lsr-flex-algo-06.txt, Network Working Group, Feb. 21, 2020, 34 pages.

* cited by examiner

OPERATIONS, ADMINISTRATION, AND MANAGEMENT/MAINTENANCE RESPONSE REPLICATION

TECHNICAL FIELD

The present disclosure relates to computer networking.

BACKGROUND

Operations, Administration, and Management/Maintenance (OAM) is a technology that helps define operational characteristics of computer networks. Many OAM mechanisms have been developed over the years to serve various operational purposes. Some such OAM mechanisms are generic in nature and are applicable to various use cases, while others are use case specific.

DESCRIPTION OF EXAMPLE EMBODIMENTS

Overview

Techniques described herein relate to Operations, Administration, and Management/Maintenance (OAM) response replication. In one example embodiment, a network entity operating as a responder obtains an OAM probe packet from a network entity operating as an initiator in a network, provides, to the initiator, a first response to the OAM probe packet over a first network path in the network, and further provides, to the initiator, a second response to the OAM probe packet over a second network path in the network that is different from the first network path. In another example embodiment, a network entity operating as an initiator provides an OAM probe packet to a network entity operating as a responder in a network, obtains, from the responder, a first response to the OAM probe packet over a first network path in the network, and further obtains, from the responder, a second response to the OAM probe packet over a second network path in the network that is different from the first network path.

EXAMPLE EMBODIMENTS

Figure 1:
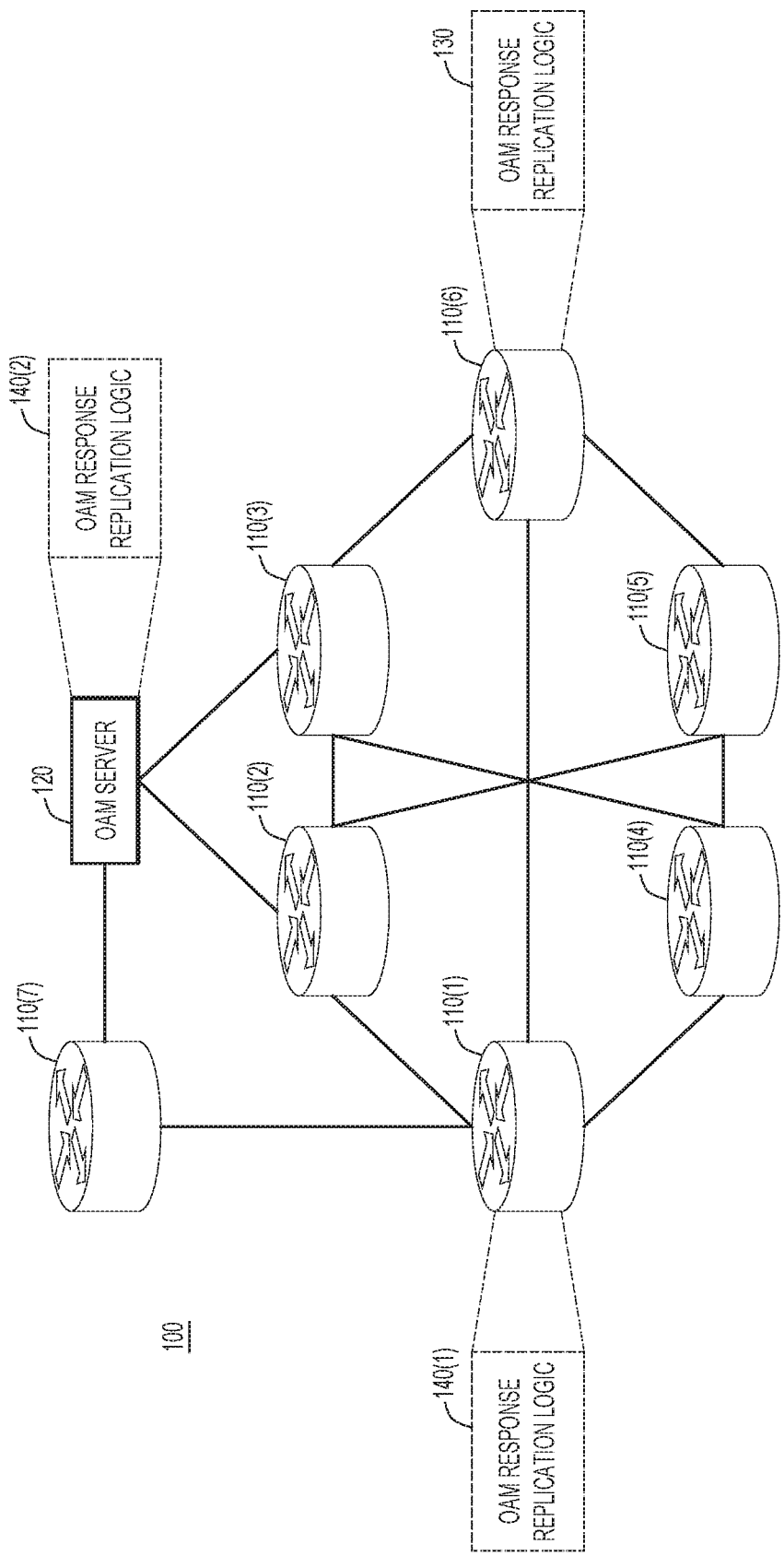
FIG. 1 illustrates a system configured for Operations, Administration, and Management/Maintenance (OAM) response replication to validate a network path, according to an example embodiment.

FIG. 1 illustrates an example system 100 configured for Operations, Administration, and Management/Maintenance (OAM) response replication to validate a network path. System 100 includes network nodes 110(1)-110(7) and, optionally, OAM server 120. Network nodes 110(1)-110(7) may be any suitable type(s) of network nodes, such as routers, switches, firewalls, gateways, etc. OAM server 120 may be a centralized OAM server. Network nodes 110(1)-110(7) and/or OAM server 120 may support any suitable type of protocol configurable for use with OAM techniques, such as Internet Control Message Protocol (ICMP), ICMP version 6 (ICMPv6), ICMP Ping, Bidirectional Forwarding Detection (BFD), Seamless BFD (S-BFD), Multiprotocol Label Switching (MPLS) Label-Switched Path (LSP) Ping, Segment Routing OAM (SR-OAM), PerfMeasure, etc.

OAM network path validation (e.g., determining whether a network path is healthy/viable/operable) may involve an initiator sending a probe packet to a responder over the network path to be validated and receiving a response from the responder. Consider an example in which the network path to be validated is the network path including the segment between network node 110(1) and network node 110(4), the segment between network node 110(4) and network node 110(5), and the segment between network node 110(5) and network node 110(6). Here, network node 110(1) is the initiator, and network node 110(6) is the responder. Traditionally, network node 110(1) would send a probe packet to network node 110(6) over the network path, and network node 110(6) would send a response to network node 110(1). The response could be sent back over any suitable network path (e.g., over the same network path or a different network path).

If network node 110(1) receives the response from network node 110(6), then traditionally the network path between network node 110(1) and network node 110(6) would be considered to be validated. Conversely, if network node 110(1) does not receive the response from network node 110(6), then traditionally the network path between network node 110(1) and network node 110(6) would not be considered a valid network path. In that case, network node 110(1) would reroute network traffic over a sub-optimal backup network path (and/or mistakenly declare the network path as being down, trigger additional OAM probe packets, etc.).

For example, instead of routing network traffic from network node 110(1) to network node 110(6) over the aforementioned network path, network node 110(1) might instead begin route network traffic over the network path including the segment between network node 110(1) and network node 110(2), the segment between network node 110(2) and network node 110(3), and the segment between network node 110(3) and network node 110(6). The backup network path might be sub-optimal because, for example, it introduces additional latency to network traffic routed from network node 110(1) to network node 110(6). However, when network node 110(1) determines that the network path including the segment between network node 110(1) and network node 110(4), the segment between network node 110(4) and network node 110(5), and the segment between network node 110(5) and network node 110(6) cannot be validated, the sub-optimal backup network path is considered the next-best option.

In such traditional approaches, network traffic can be rerouted over the sub-optimal backup network path unnecessarily. This is because there are at least two reasons that the initiator would not receive the response: (1) the probe packet did not reach the responder over the network path to be validated; or (2) the probe packet reached the responder but the response did not reach the initiator. Since the initiator typically cannot differentiate between these situations, the latter case can result in "false positives" in conventional systems whereby the initiator incorrectly determines that the network path to be validated is not valid and unnecessarily reroutes network traffic over the sub-optimal backup network path.

For example, traditionally, if network node 110(1) were to send a probe packet to network node 110(6) over the aforementioned network path between network node 110(1) and network node 110(6), and the probe packet successfully reaches network node 110(6), then the network path between network node 110(1) and network node 110(6) is a valid network path. However, if network node 110(6) were to send the response back to network node 110(1), but the response is dropped before reaching network node 110(1), then network node 110(1) would determine that the network path between network node 110(1) and network node 110(6) is not valid and would reroute traffic over the sub-optimal backup network path, even though the network path between network node 110(1) and network node 110(6) is in fact valid. This could introduce unnecessary latency into system 100.

Similar problems are also present in traditional centralized OAM server based approaches. Consider an example in which the network path to be validated is the network path including the segment between network node 110(1) and network node 110(6), OAM server 120 is the initiator, and network node 110(6) is the responder. Traditionally, OAM server 120 would cause network node 110(1) to send a probe packet to network node 110(6) over the network path between network node 110(1) and network node 110(6), and network node 110(6) would send a response to OAM server 120. OAM server 120 could send the probe packet to network node 110(1) over any suitable network path (e.g., the network path including the segment between OAM server and network node 110(7) and the segment between network node 110(7) and network node 110(1)), and the response could be sent from network node 110(6) to OAM server 120 over any suitable network path (e.g., the network path including the segment between network node 110(6) and network node 110(3) and the segment between network node 110(3) and OAM server 120).

Traditionally, if OAM server 120 were to cause network node 110(1) to send a probe packet to network node 110(6) over the network path including the segment between network node 110(1) and network node 110(6), and the probe packet successfully reached network node 110(6), then the network path between network node 110(1) and network node 110(6) would be deemed a valid network path. However, if network node 110(6) were to send the response to OAM server 120, but the response was dropped before reaching OAM server 120, then OAM server 120 would determine that the network path between network node 110(1) and network node 110(6) is not valid and would reroute traffic over a sub-optimal backup network path (e.g., a network path including the network path including the segment between network node 110(1) and network node 110(2), the segment between network node 110(2) and network node 110(3), and the segment between network node 110(3) and network node 110(6)), even though the network path including the segment between network node 110(1) and network node 110(6) is actually a valid path. This could introduce unnecessary latency into system 100.

Accordingly, network node 110(6) is configured with OAM response replication logic 130 to cause network node 110(6) to provide multiple response packets over different network paths to an initiator (e.g., network node 110(1) or OAM server 120). It will be appreciated that any suitable responder (e.g., network nodes 110(1)-110(7)) may be configured with similar OAM response replication logic. Also, network node 110(1) may be configured with OAM response replication logic 140(1) and OAM server 120 configured with OAM response replication logic 140(2) to, respectively, cause network node 110(1) and OAM server 120 to obtain multiple response packets over different network paths from a responder (e.g., network node 110(6)). It will be appreciated that any suitable initiator (e.g., network nodes 110(1)-110(7) or OAM server 120) may be configured with similar OAM response replication logic. Depending on the specific implementation, a given network node may be an initiator, a responder, or both an initiator and a responder. In case a given network node is both an initiator and a responder, that network node may perform operations associated with an initiator in some instances and may further perform operations associated with a responder in other instances.

In one example, network node 110(1) or OAM server 120 may provide a probe packet to network node 110(6). Network node 110(6) may obtain the probe packet from network node 110(1) or OAM server 120. Network node 110(6) may provide, to network node 110(1) or OAM server 120, a first response to the probe packet over a first network path and a second response to the probe packet over a second network path. Network node 110(1) or OAM server 120 may obtain, from network node 110(6), the first response to the probe packet over the first network path and the second response to the probe packet over the second network path.

Consider the example in which the network path to be validated is the network path including the segment between network node 110(1) and network node 110(4), the segment between network node 110(4) and network node 110(5), and the segment between network node 110(5) and network node 110(6). Network node 110(1) is the initiator and network node 110(6) is the responder. In this case, the first network path may include the segment between network node 110(6) and network node 110(5), the segment between network node 110(5) and network node 110(4), and the segment between network node 110(4) and network node 110(1). The second network path may include the segment between network node 110(6) and network node 110(3), the segment between network node 110(3) and network node 110(2), and the segment between network node 110(2) and network node 110(1).

To further ensure that at least one of the responses arrives at network node 110(1), each segment of the first network path before network node 110(1) differs from each segment of the second network path before the initiator. That is, the segments between network node 110(6) and network node 110(5), between network node 110(5) and network node 110(4), and between network node 110(4) and network node 110(1) each differ from the segments between network node 110(6) and network node 110(3), the segment between network node 110(3) and network node 110(2), and the segment between network node 110(2) and network node 110(1). This may help avoid a situation where both responses may be dropped at a single overlapping segment in both network paths.

Consider also the example in which the network path to be validated is the network path including the segment between network node 110(1) and network node 110(6). OAM server 120 is the initiator and network node 110(6) is the responder. In this case, the first network path may include the segment between network node 110(6) and network node 110(3), and the segment between network node 110(3) and OAM server 120. The second network path may include the segment between network node 110(6) and network node 110(5), the segment between network node 110(5) and network node 110(2), and the segment between network node 110(2) and OAM server 120.

Each segment of the first network path before OAM server 120 differs from each segment of the second network path before the initiator. That is, the segments between network node 110(6) and network node 110(3), and network node 110(3) and OAM server 120 differ from the segments between network node 110(6) and network node 110(5), network node 110(5) and network node 110(2), and network node 110(2) and OAM server 120. This may help avoid a situation where both responses are dropped at a single overlapping segment in both network paths.

These techniques may be protocol-agnostic, and as such may apply to any suitable OAM protocol using any appropriate extensions. For example, techniques described herein may be implemented for distributed Ping-like OAM (e.g., where network node 110(1) is the initiator) as well as centralized OAM server approaches (e.g., where OAM server 120 is the initiator). A semantic may be introduced to the probe packet instructing the responder (e.g., network node 110(6)) to replicate and forward the response over different (uncorrelated) disjointed network paths. For Ping-like OAM, a control plane semantic may be inserted into an OAM payload of the probe packet, and for centralized OAM server approaches, a data plane semantic may be inserted into a header of the probe packet (e.g., as a Segment ID (SID) of the probe packet). However, it will be appreciated that in other examples a control plane semantic may be utilized in a centralized OAM server approach and a data plane semantic may be utilized for distributed Ping-like OAM.

Figure 5:
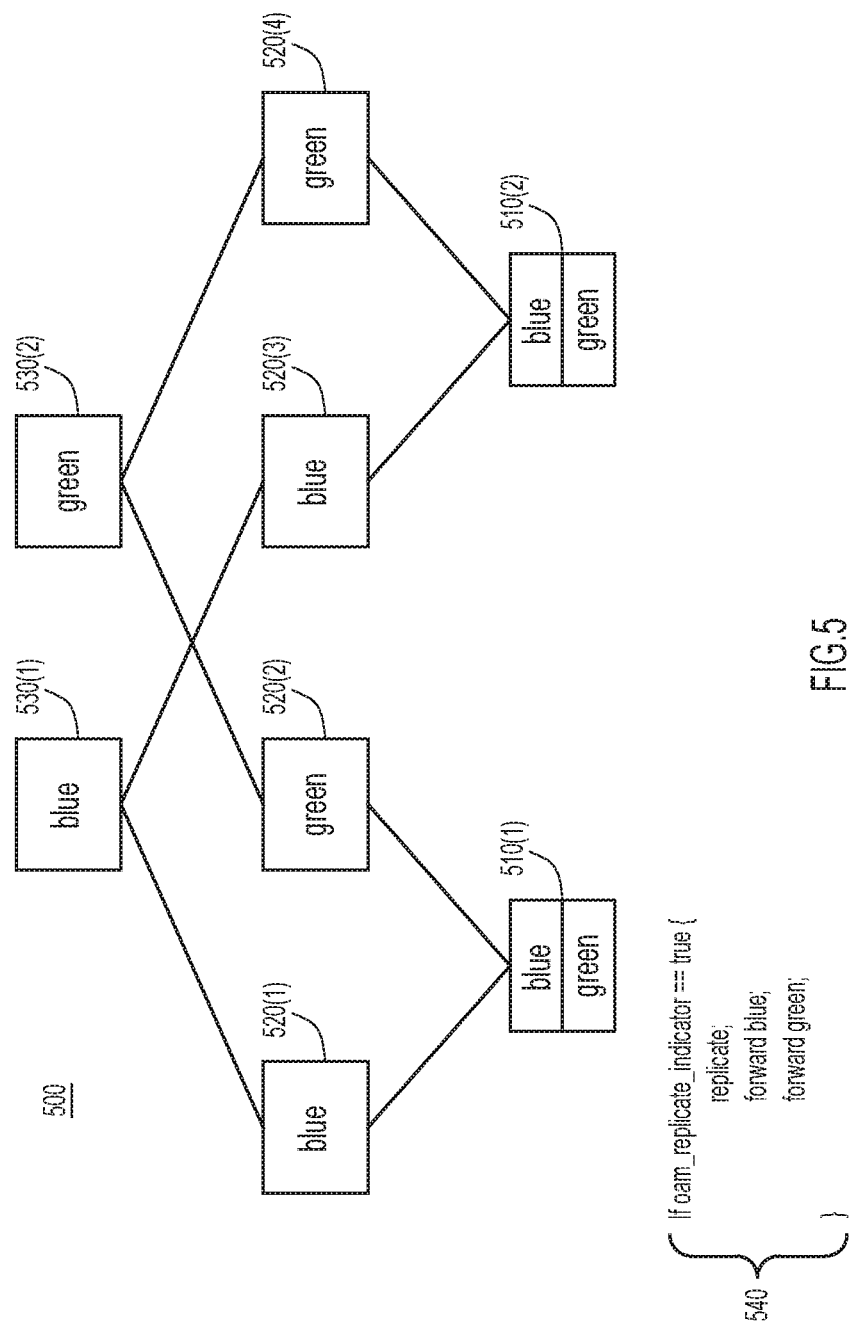
FIG. 5 illustrates a dual-plane system configured for control plane based OAM response replication, according to an example embodiment.
Figure 6:
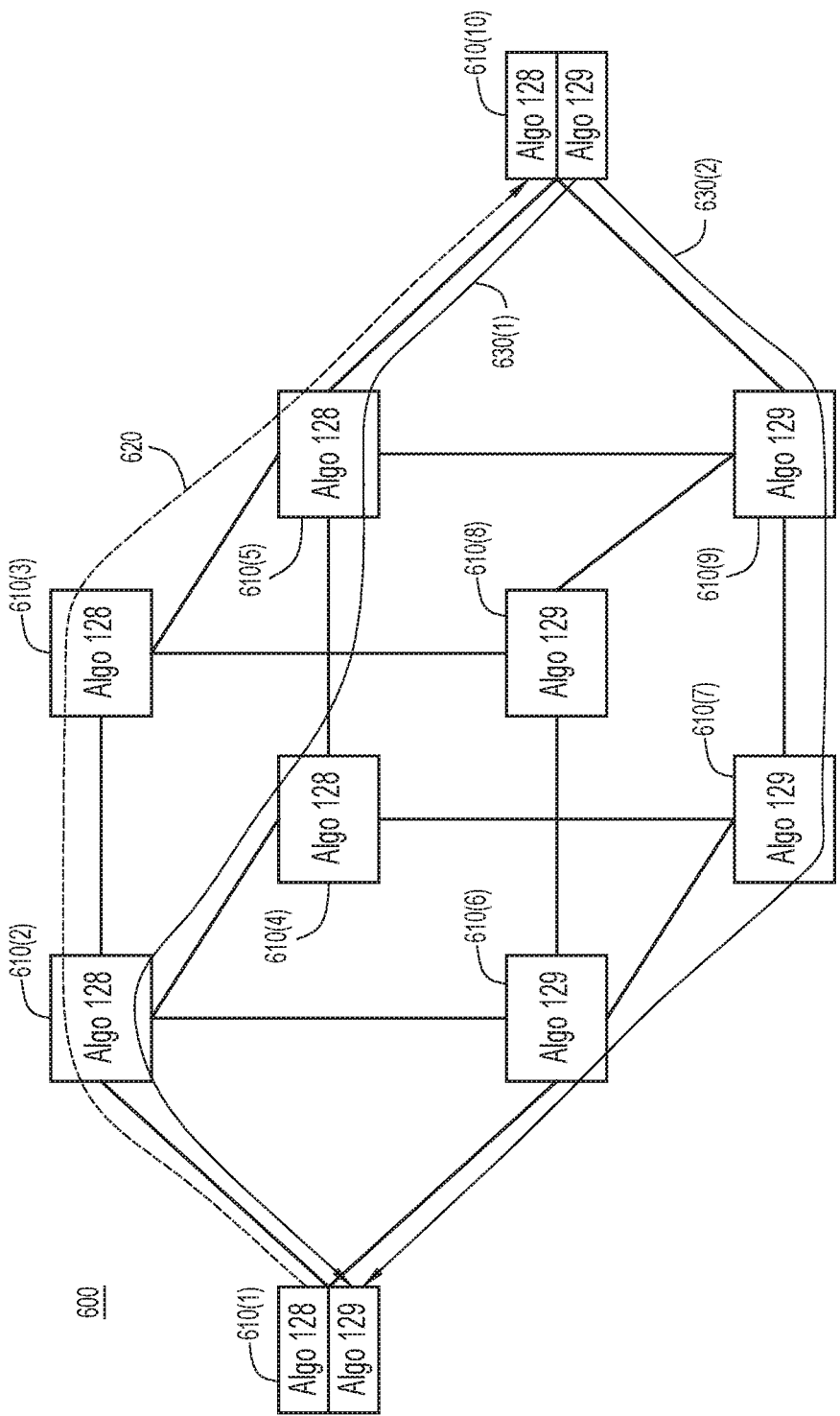
FIG. 6 illustrates a system configured for control plane based OAM response replication using Segment Routing (SR) Flexible Algorithm (Flex Algo) technology, according to an example embodiment.
Figure 7:
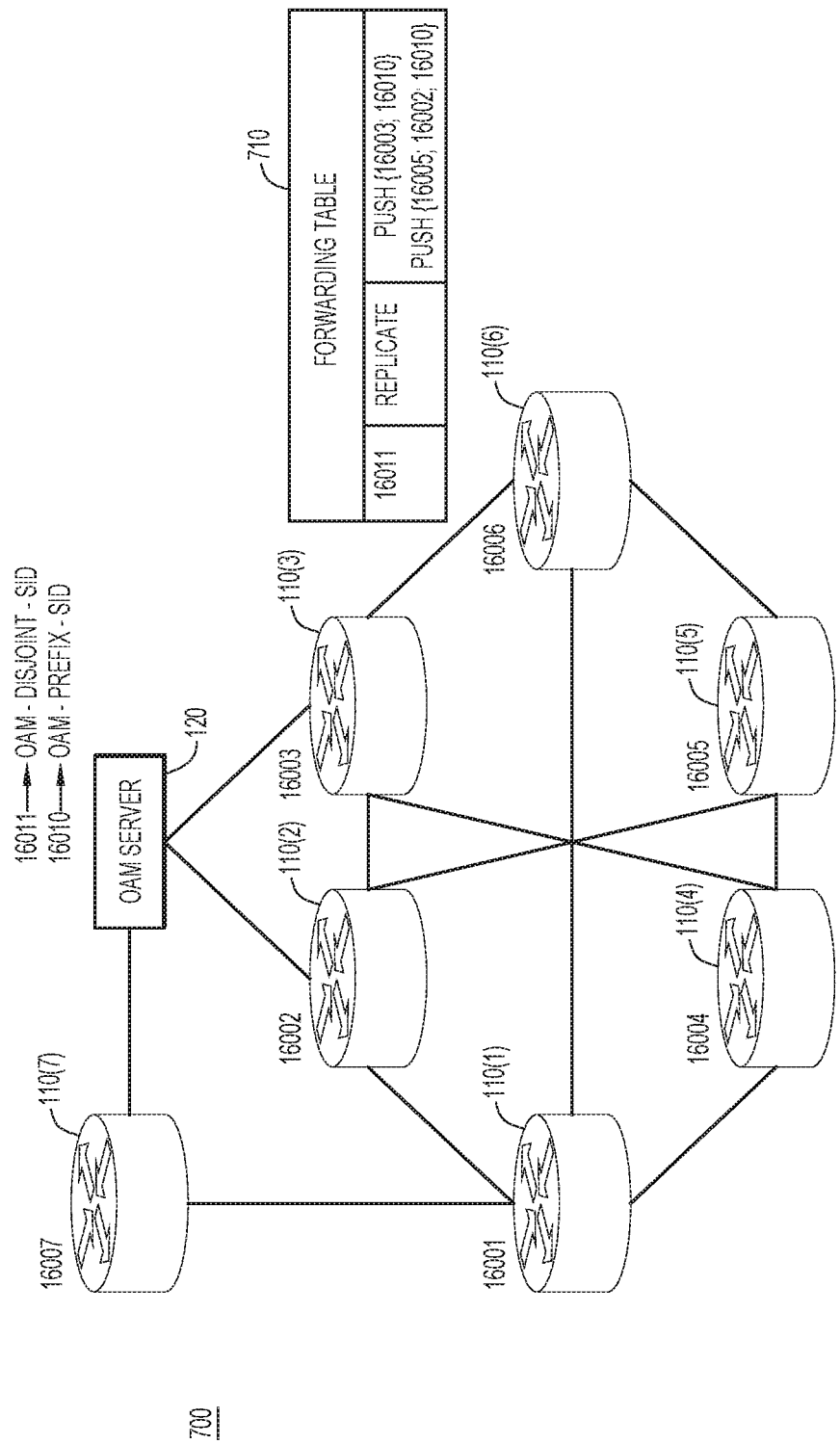
FIG. 7 illustrates a system configured for data plane based OAM response replication, according to another example embodiment.
Figure 8:
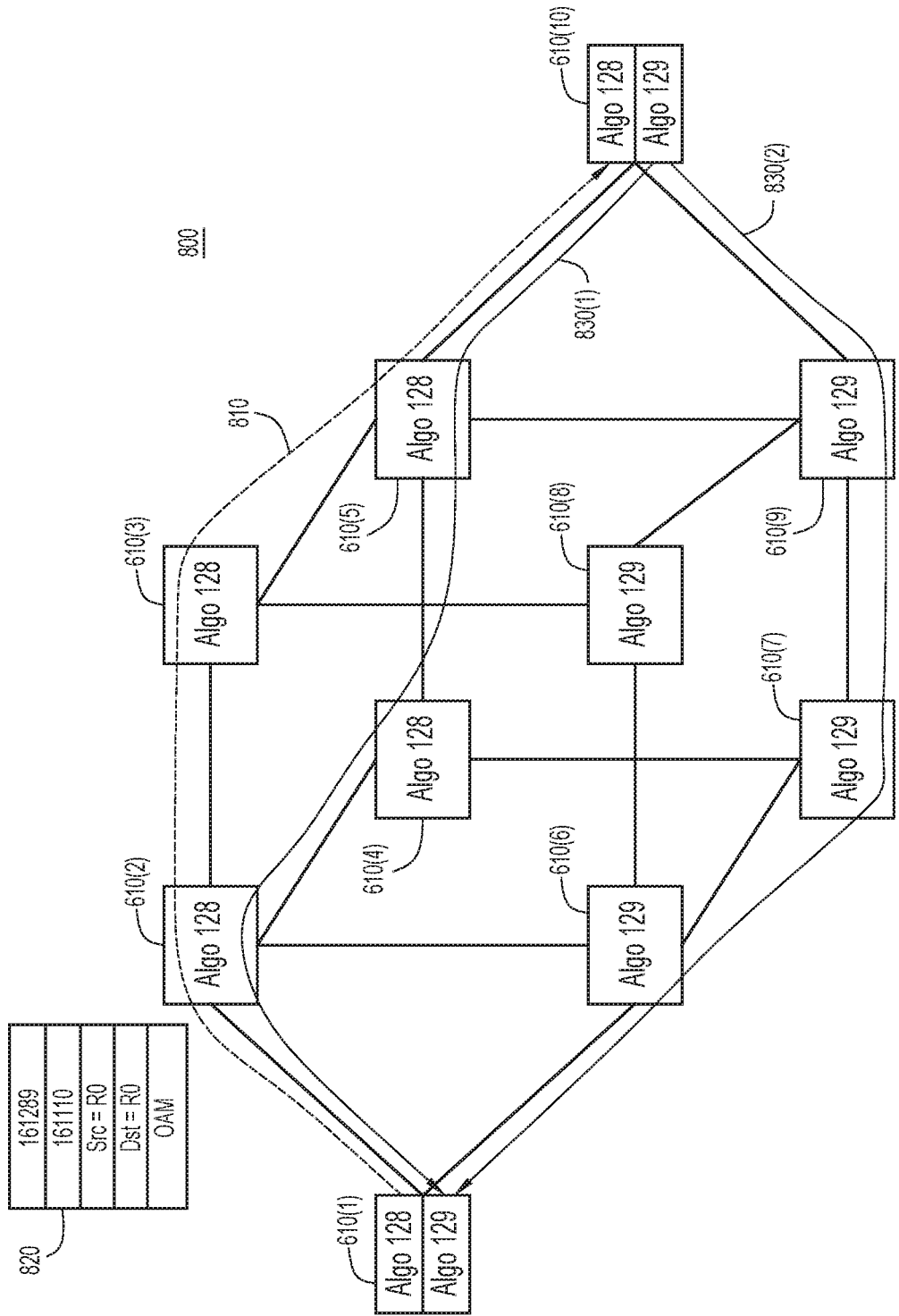
FIG. 8 illustrates a system configured for data plane based OAM response replication using SR Flex Algo technology, according to another example embodiment.

FIGS. 2-6 illustrate examples involving a control plane semantic, and FIGS. 7 and 8 illustrate examples involving a data plane semantic. The control plane semantic may explicitly signal/indicate a request to replicate a response to an OAM probe packet and forward the responses via respective/uncorrelated/disjointed network paths. The initiator may insert the control plane semantic in the OAM payload before sending the probe packet to the responder. The control plane semantic may prompt the responder to generate a response, replicate the generated response, and forward the responses over disjointed network paths. The specific indicator may vary depending on the particular type of OAM protocol. In the control plane based approach, the payload of the probe packet may be processed by the responder to identify the control plane semantic. In the data plane based approach, the responder may replicate and forward the responses based on a destination of the probe packet (e.g., by processing a label stack of the probe packet) without processing/examining the payload itself.

Figure 2:
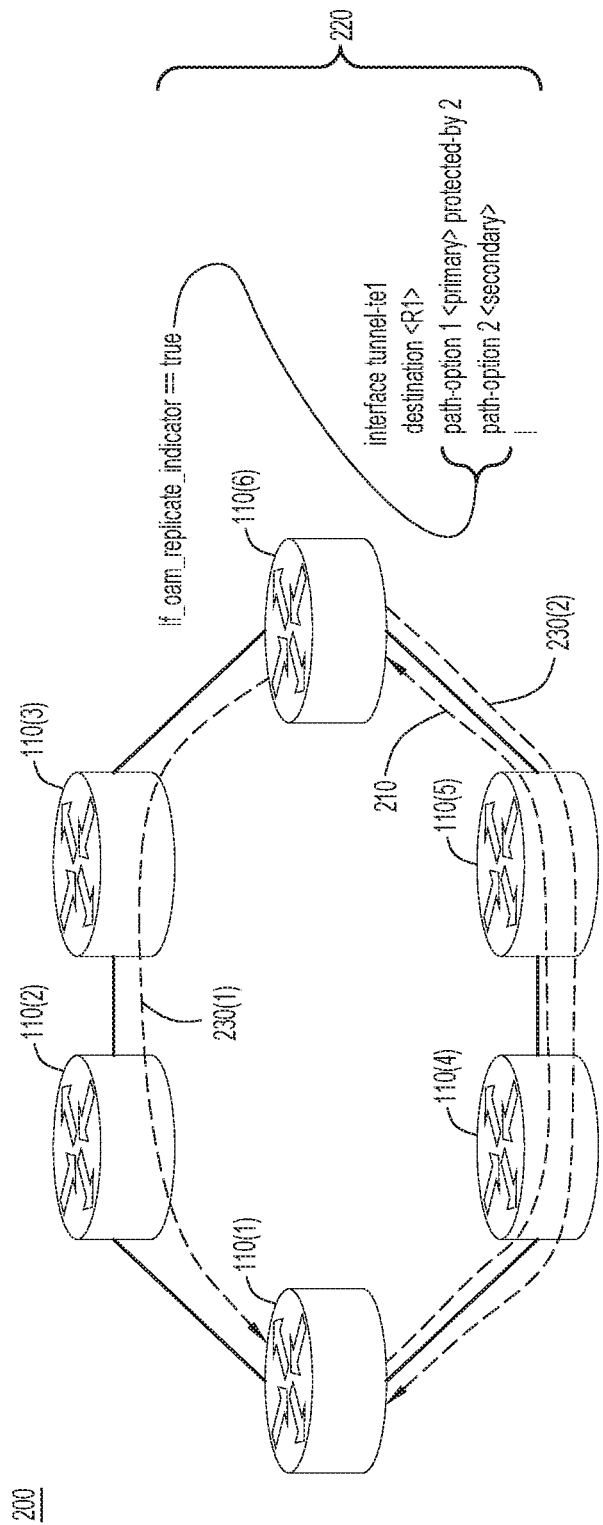
FIG. 2 illustrates a system configured for control plane based OAM response replication, according to an example embodiment.

FIG. 2 illustrates an example system 200 configured for control plane based OAM response replication. System 200 may be a service provider network, and may include network nodes 110(1)-110(6). In this example, the network path to be validated is the network path including the segment between network node 110(1) and network node 110(4), the segment between network node 110(4) and network node 110(5), and the segment between network node 110(5) and network node 110(6). Network node 110(1) is the initiator, and network node 110(6) is the responder. As represented by arrow 210, network node 110(1) provides a probe packet to network node 110(6) over the network path including the segment between network node 110(1) and network node 110(4), the segment between network node 110(4) and 110(5), and the segment between network node 110(5) and 110(6). Network node 110(6) thereby obtains the probe packet from network node 110(1).

Pseudocode 220 shown in FIG. 2 may represent software code implemented on network node 110(6) (e.g., configured with OAM response replication logic 130). The probe packet may include an explicit indication to provide, to network node 110(1), a first response to the probe packet and a second response to the probe packet. For example, the indication "oam_replicate_indicator" in the probe packet may be set to true. The explicit indication may instruct network node 110(6) to replicate the response, send a first response over a first network path, and send a second response over a second network path. More specifically, upon receiving the probe packet, network node 110(6) may query its local Routing Information Base (RIB) for the first and second network paths to the source address of network node 110(1), from which the probe packet was obtained, and replicate the response.

In this example, the first network path includes the segment between network node 110(6) and network node 110(3), the segment between network node 110(3) and 110(2), and the segment between network node 110(2) and network node 110(1). The second network path includes the segment between network node 110(6) and network node 110(5), the segment between network node 110(5) and 110(4), and the segment between network node 110(4) and network node 110(1). As represented by arrow 230(1), in response to the explicit indication, network node 110(6) may provide the first response over the first network path, and network node 110(1) may obtain the first response over the first network path. As represented by arrow 230(2), in response to the explicit indication, network node 110(6) may also provide the second response over the second network path, and network node 110(1) may obtain the second response over the second network path.

A policy/Traffic Engineering (TE) tunnel, with network path protection, toward network node 110(1) may be created/programmed on network node 110(6). For example, the first network path may be the primary network path and the second network path may be the protected backup network path. The tunnel may utilize any suitable TE technology, such as MPLS-TE, SR-TE, etc., and may use both network paths in active-active mode or active-standby mode. The tunnel may be bidirectional, because traffic may proceed in either direction along or in reverse of the second network path (e.g., arrows 210 and 230(2)). However, it will be appreciated that these techniques may also apply for unidirectional tunnels whereby the responder queries its local RIB to send two responses over two different network paths. Bidirectional tunnels may be utilized in optical scenarios, and unidirectional tunnels may be utilized in latency management/MPLS scenarios.

Figure 3:
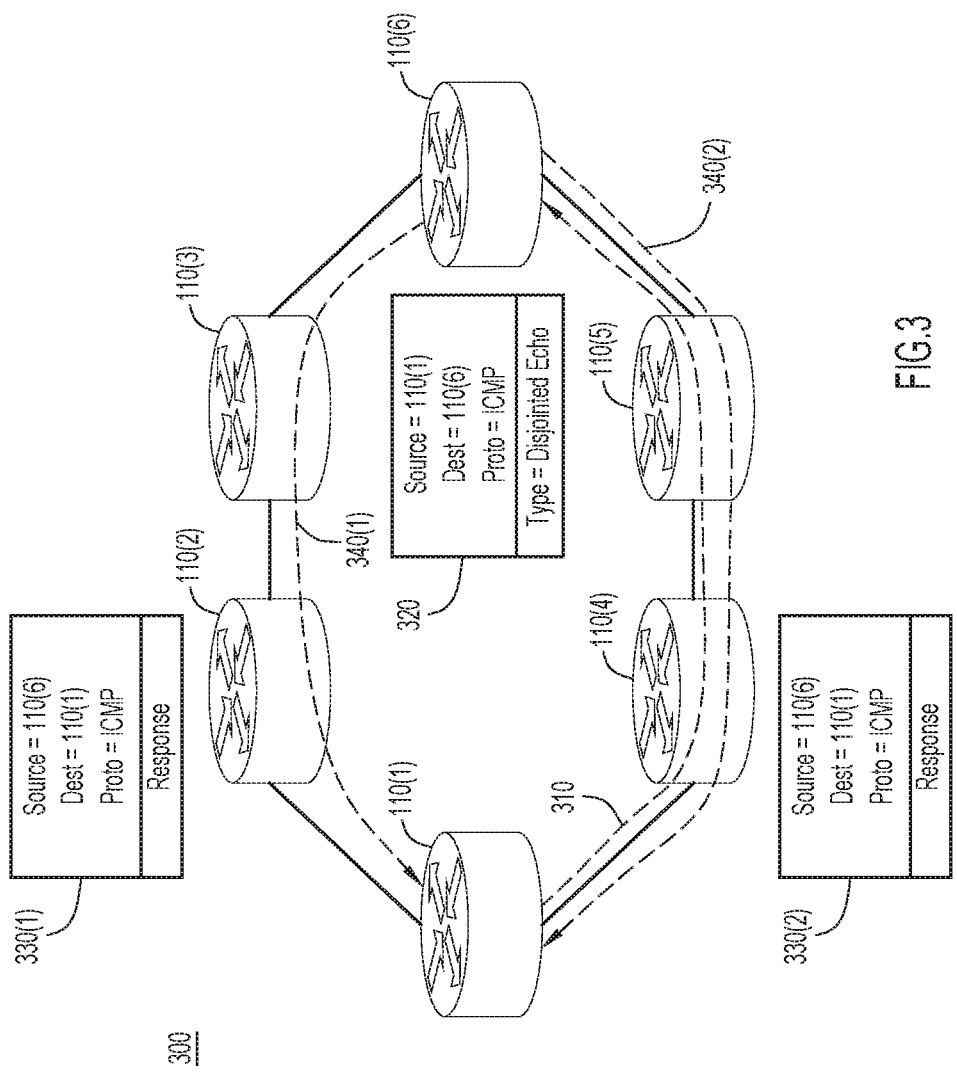
FIG. 3 illustrates a system configured for control plane based OAM response replication using Internet Control Message Protocol (ICMP), according to an example embodiment.

Three specific control plane semantic use cases are now described: an ICMP/ICMPv6 use case, an S-BFD use case, and an MPLS LSP Ping use case. Turning first to FIG. 3, shown is an example system 300 configured for control plane based OAM response replication using ICMP/ICMPv6. ICMP is an OAM toolkit that can be used for fault detection, isolation, and error reporting in an Internet Protocol (IP) network (e.g., an IP version 4 (IPv4) network or an IP version 6 (IPv6) network). In this example, the network path to be validated is the network path including the segment between network node 110(1) and network node 110(4), the segment between network node 110(4) and network node 110(5), and the segment between network node 110(5) and network node 110(6). Network node 110(1) is the initiator, and network node 110(6) is the responder.

As represented by arrow 310, network node 110(1) provides probe packet 320 to network node 110(6) over the network path including the segment between network node 110(1) and network node 110(4), the segment between network node 110(4) and 110(5), and the segment between network node 110(5) and 110(6). Network node 110(6) thereby obtains probe packet 320 from network node 110(1). Probe packet 320 identifies network node 110(1) as the source network node, network node 110(6) as the destination network node, and ICMP as the applicable protocol. Probe packet 320 also includes an explicit indication ("Type=Disjointed Echo"), such as a request type or a Type-Length-Value (TLV) in the payload, to provide responses 330(1) and 330(2) to network node 110(1).

Responses 330(1) and 330(2) may identify network node 110(6) as the source network node, network node 110(1) as the destination network node, and ICMP as the applicable protocol. Responses 330(1) and 330(2) also include an indication of packet type ("Response"). As represented by arrow 340(1), in response to the explicit indication, network node 110(6) may provide response 330(1) over a first (e.g., primary) network path, and network node 110(1) may obtain response 330(1) over the first network path. In this example, the first network path includes the segment between network node 110(6) and network node 110(3), the segment between network node 110(3) and 110(2), and the segment between network node 110(2) and network node 110(1). As represented by arrow 340(2), in response to the explicit indication, network node 110(6) may also provide response 330(2) over a second (e.g., backup) network path, and network node 110(1) may obtain response 330(2) over the second network path. The second network path includes the segment between network node 110(6) and network node 110(5), the segment between network node 110(5) and 110(4), and the segment between network node 110(4) and network node 110(1).

Figure 4:
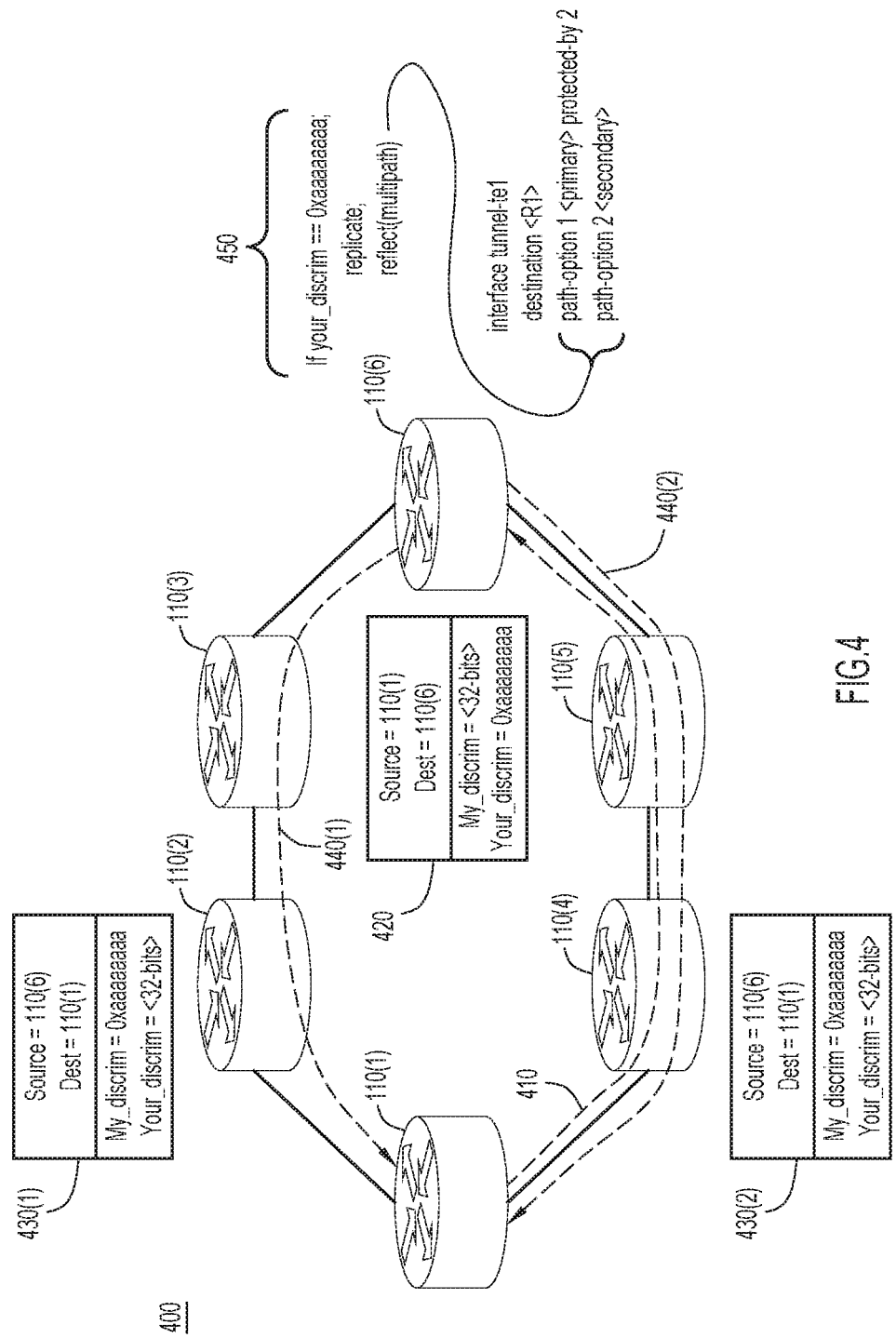
FIG. 4 illustrates a system configured for control plane based OAM response replication using Seamless Bidirectional Forwarding Detection (S-BFD), according to an example embodiment.

FIG. 4 illustrates an example system 400 configured for control plane based OAM response replication using S-BFD. BFD/S-BFD may be used for continuity check and rapid failure detection. In this example, the network path to be validated is the network path including the segment between network node 110(1) and network node 110(4), the segment between network node 110(4) and network node 110(5), and the segment between network node 110(5) and network node 110(6). Network node 110(1) is the initiator, and network node 110(6) is the responder.

As represented by arrow 410, network node 110(1) provides probe packet 420 to network node 110(6) over the network path including the segment between network node 110(1) and network node 110(4), the segment between network node 110(4) and 110(5), and the segment between network node 110(5) and network node 110(6). Network node 110(6) thereby obtains probe packet 420 from network node 110(1). Probe packet 420 identifies network node 110(1) as the source network node, network node 110(6) as the destination network node, and a "My Discriminator" (e.g., a 32-bit string). Probe packet 420 also includes an explicit indication ("Your_discrim=0xaaaaaaaa"), such as a "Your Discriminator" (e.g., a 32-bit string), to provide responses 430(1) and 430(2) to network node 110(1). Thus, in this example, the control plane semantic is associated with a discriminator (e.g., the "Your Discriminator" field in probe packet 420) that instructs network node 110(6) to replicate and forward the responses over disjointed network paths.

Responses 430(1) and 430(2) may identify network node 110(6) as the source network node, network node 110(1) as the destination network node, a "My Discriminator," and a "Your Discriminator." The "My Discriminator" field in responses 430(1) and 430(2) may be set to the "Your Discriminator" field in probe packet 420 (e.g., 0xaaaaaaaa). The "Your Discriminator" field in responses 430(1) and 430(2) may be set to the "My Discriminator" field in probe packet 420 (e.g., the same 32-bit string).

As represented by arrow 440(1), in response to the explicit indication, network node 110(6) may provide response 430(1) over a first (e.g., primary) network path, and network node 110(1) may obtain response 430(1) over the first network path. Network node 110(6) may perform these operations based on pseudocode 450, which may represent software code implemented on network node 110(6) (e.g., configured with OAM response replication logic 130). In this example, the first network path includes the segment between network node 110(6) and network node 110(3), the segment between network node 110(3) and 110(2), and the segment between network node 110(2) and network node 110(1).

As represented by arrow 440(2), in response to the explicit indication, network node 110(6) may provide response 430(2) over a second (e.g., backup) network path, and network node 110(1) may obtain response 430(2) over the first network path. Network node 110(6) may also perform these operations based on pseudocode 450. In this example, the second network path includes the segment between network node 110(6) and network node 110(3), the segment between network node 110(3) and 110(2), and the segment between network node 110(2) and network node 110(1).

In addition to ICMP (FIG. 3) and S-BFD (FIG. 4), a third use case for the control plane semantic involves MPLS LSP Ping, which may be used to define fault detection and isolation in MPLS networks. In this case, the probe packet may include a control plane flag, such as any of return codes 1-5 as shown below. Return code 5 may serve as an explicit indication for the responder to provide replicated responses over disjointed network paths to the initiator.

Value Meaning
---- -------
  1 Do not reply
  2 Reply via an IPv4/IPv6 User Datagram Protocol (UDP) packet
  3 Reply via an IPv4/IPv6 UDP packet with router alert 4 Reply via application-level control channel 5 Replicated reply via disjointed network path FIG. 5 illustrates an example dual-plane system 500 configured for control plane based OAM response replication. Dual-plane system 500 may be a datacenter Clos network, and may include leaf nodes 510(1) and 510(2) in a first tier, middle nodes 520(1)-520(4) in a second tier, and spine nodes 530(1) and 530(2) in a third tier. Dual-plane system 500 is "dual-plane" because there are two planes present: a "blue" plane and a "green" plane. "Blue" nodes may communicate with other "blue" nodes, and "green" nodes may communicate with other "green" nodes. Thus, spine node 530(1) is in communication with middle nodes 520(1) and 520(3) because they are "blue" nodes, and spine node 530(2) is in communication with middle nodes 520(2) and 520(4) because they are "green" nodes.

Leaf nodes 510(1) and 510(2) are both "blue" and "green" and as such may communicate with both "blue" nodes and "green" nodes. In particular, leaf node 510(1) is in communication with middle nodes 520(1) (blue) and 520(2) (green), and leaf node 510(2) is in communication with middle nodes 520(3) (blue) and 520(4) (green). Thus, leaf nodes 510(1) and 510(2) are connected over both the blue and green planes. In one example, dual-plane system 500 is a Fifth Generation (5G) mobile network system in which the "blue" plane is a first network slice and the "green" plane is a second network slice.

In this example, the network path to be validated may be any suitable network path between leaf nodes 510(1) and 510(2) (e.g., the "blue" plane, the "green" plane, or any other network path not explicitly shown). Leaf node 510(2) is the initiator, and leaf node 510(1) is the responder. Leaf node 510(2) provides a probe packet to leaf node 510(1) over the network path to be validated. Leaf node 510(1) thereby obtains the probe packet from leaf node 510(2).

Pseudocode 540 may represent software code implemented on leaf node 510(1) (e.g., comprising OAM response replication logic 130). The probe packet may include an explicit indication to provide, to leaf node 510(2), a first response to the probe packet and a second response to the probe packet. For example, the indication "oam_replicate_indicator" in the probe packet may be set to true. The explicit indication may instruct leaf node 510(1) to replicate the response, send a first response over a first network path, and send a second response over a second network path.

In this example, the first network path includes the "blue" plane (e.g., the network path including the segment between leaf node 510(1) and middle node 520(1), the segment between middle node 520(1) and spine node 530(1), the segment between spine node 530(1) and middle node 520(3), and the segment between middle node 520(3) and leaf node 510(2)). Leaf node 510(1) may thus provide the first response over the "blue" plane, and leaf node 510(2) may obtain the first response over the "blue" plane. The second network path includes the "green" plane (e.g., the network path including the segment between leaf node 510(1) and middle node 520(2), the segment between middle node 520(2) and spine node 530(2), the segment between spine node 530(2) and middle node 520(4), and the segment between middle node 520(4) and leaf node 510(2)). Leaf node 510(1) may thus provide the second response over the "green" plane, and leaf node 510(2) may obtain the second response over the "green" plane.

FIG. 6 illustrates an example system 600 configured for control plane based OAM response replication using SR Flexible Algorithm (Flex Algo) technology. System 600 includes network nodes 610(1)-610(10) configured for SR Flex Algo. In this context, SR Flex Algo permits dynamic calculation of network paths between network nodes 610(1) and 610(10). For example, network node 610(10) may dynamically calculate a network path to network node 610(1) over network nodes 610(2)-610(5) for packets designated for "Algo 128," and may dynamically calculate a network path to network node 610(1) over network nodes 610(6)-610(9) for packets designated for "Algo 129." Thus, network nodes 610(2)-610(5) support "Algo 128" network paths and may comprise an "Algo 128" plane. Network nodes 610(6)-610(9) support "Algo 129" network paths and may comprise an "Algo 129" plane.

In this example, the network path to be validated includes the segment between network node 610(1) and network node 610(2), the segment between network node 610(2) and network node 610(3), the segment between network node 610(3) and network node 610(5), and the segment between network node 610(5) and network node 610(10). Network node 610(1) is the initiator, and network node 610(10) is the responder. As represented by arrow 620, network node 610(1) provides a probe packet to network node 610(10) over the network path to be validated. Network node 610(10) thereby obtains the probe packet from network node 610(1).

The probe packet may include an explicit indication to provide, to network node 610(1), a first response to the probe packet and a second response to the probe packet. For example, the explicit indication may be a control plane flag used in MPLS LSP Ping. The explicit indication may instruct network node 610(10) to replicate the response, send a first response over a first network path (e.g., in a first plane, such as the "Algo 128" plane), and send a second response over a second network path (e.g., in a second plane, such as the "Algo 129" plane). Accordingly, network node 610(10) may replicate the response and send the first response over the first network path in the "Algo 128" plane, and send the second response over the second network path in the "Algo 129" plane.

As represented by arrow 630(1), based on Algo 128, network node 610(10) may provide the first response over the first network path, and network node 610(1) may obtain the first response over the first network path. In this example, the first network path includes the segment between network node 610(10) and network node 610(5), the segment between network node 610(5) and 610(4), the segment between network node 610(4) and network node 610(2), and the segment between network node 610(2) and network node 610(1). Thus, the first network path may be established in the "Algo 128" plane. In one example, the first response may include the Algo Prefix SID for Algo 128.

In particular, as represented by arrow 630(2), based on Algo 129, network node 610(10) may provide the second response over the first network path, and network node 610(1) may obtain the second response over the second network path. In this example, the second network path includes the segment between network node 610(10) and network node 610(9), the segment between network node 610(9) and 610(7), the segment between network node 610(7) and network node 610(6), and the segment between network node 610(6) and network node 610(1). Thus, the second network path may be established in the "Algo 129" plane. In one example, the second response may include the Algo Prefix SID for Algo 129.

Unlike the examples of FIGS. 2-6, which utilize a control plane semantic, the examples of FIG. 7 and FIG. 8 utilize a data plane semantic. FIG. 7 illustrates an example system 700 configured for data plane based OAM response replication. System 700 includes network nodes 110(1)-110(7) and OAM server 120, which may be configured to support Segment Routing (SR). For example, network nodes 110 (1)-110(7) are identified by Segment Identifiers (SIDs) 16001-16007, respectively. OAM server 120 is identified by SIDs 16010 and 16011. SID 16010 may be a globally unique SID to identify OAM server 120. SID 16011 may be the data plane semantic, referred to herein as "OAM-Disjoint-SID." The OAM-Disjoint-SID may be an identifier indicating that the probe packet is destined for OAM server 120.

In this example, the network path to be validated is the network path including the segment between network node 110(1) and network node 110(6), OAM server 120 is the initiator, and network node 110(6) is the responder. Initially, OAM server 120 advertises 16010 as its prefix SID and 16011 as the OAM-Disjoint-SID to network nodes 110(1)- 110(7). In response, each network node 110(1)-110(7) may compute two disjoint network paths from that respective network node 110(1)-110(7) to OAM server 120. Network nodes 110(1)-110(7) may compute the disjointed network paths to OAM server 120 using a local computation mechanism or a dedicated Path Computation Element (PCE). In either approach, the local forwarding table may be populated to signal replication of the probe packet and forwarding of the probe packet over the different pre-computed (disjoint) network paths if the incoming label is the OAM-Disjoint-SID.

For example, network node 110(6) may compute a first network path including the segment between network node 110(6) and network node 110(3), and the segment between network node 110(3) and OAM server 120, and may further compute a second network path including the segment between network node 110(6) and network node 110(5), the segment between network node 110(5) and network node 110(2), and the segment between network node 110(2) and OAM server 120. Network node 110(6) may populate forwarding table 710, which is stored locally on network node 110(6). In particular, forwarding table 710 includes an entry for the OAM-Disjoint-SID, an associated action to replicate a packet, and the first and second network packets, respectively.

In order to validate the network path from network node 110(1) to network node 110(6), OAM server 120 may provide the probe packet to network node 110(6), including the OAM-Disjoint-SID. In this example, OAM server 120 may inject the probe packet toward network node 110(1) with the SID stack including <16001><16006><16011><OAM>. When the probe packet traverses the network path from network node 110(1) to network node 110(6), the SID stack includes <16006><16011>. Network node 110(6) thereby obtains the probe packet.

It will be appreciated that OAM server 120 may use any suitable network path (e.g., using any suitable segment stack) to send the probe packet from OAM server 120 to network node 110(1). For instance, OAM server 120 may provide the probe packet to network node 110(1) via network node 110(7). In a further example, to account for failure (e.g., a dropped probe packet) between OAM server 120 and network node 110(1), OAM server 120 may send respective probe packets over respective network paths to network node 110(1). Thus, OAM server 120 may also send a second probe packet to network node 110(1) via network node 110(2).

Network node 110(6) may observe the OAM-Disjoint-SID in the probe packet, look up the 16011 entry in forwarding table 710, and determine that the probe packet should be replicated and provided (as a response) over the first and second network paths. Thus, in response to the OAM-Disjoint-SID, network node 110(6) may provide a first response over the first network path, and OAM server 120 may thereby obtain the first response over the first network path. Further, in response to the OAM-Disjoint-SID, network node 110(6) may also provide the second response over the second network path, and OAM server 120 may thereby obtain the second response over the second network path.

The SID stack including <16001><16006><16011><OAM> may not result in OAM processing at network node 110(6) because the OAM-Disjoint-SID causes network node 110(6) to forward the replicated probe packets back to the OAM server (as multiple responses) without processing the next header in the SID stack. This is a data plane based approach in which the probe packet is originated/terminated on OAM server 120 without a control plane mechanism on any transit network node (including network nodes 110(1) and 110(6)). Accordingly, in this example the replication semantic is associated at the data plane, rather than the control plane. The SID stack may steer the packet over the network path without any control plane intervention.

FIG. 8 illustrates an example system 800 configured for data plane based OAM response replication using SR Flex Algo technology. System 800 includes network nodes 610 (1)-610(10) configured for SR Flex Algo. In this example, the network path to be validated includes the segment between network node 610(1) and network node 610(2), the segment between network node 610(2) and network node 610(3), the segment between network node 610(3) and network node 610(5), and the segment between network node 610(5) and network node 610(10). Network node 610(1) is the initiator, and network node 610(10) is the responder.

As represented by arrow 810, network node 610(1) provides probe packet 820 to network node 610(10) over the network path to be validated. Probe packet 820 may have a SID stack including <161289><161110><OAM>. In this example, 16000X is a SID that corresponds an "Algo 0" network path for network node 610(X+1), 16128X is a SID that corresponds an "Algo 128" network path for network node 610(X+1), 16129X is a SID that corresponds an "Algo 129" network path for network node 610(X+1), and 16111X is an OAM-Disjoint-SID for network node 610(X+1). Thus, the <161289> SID in probe packet 820 causes network node 610(10) to obtain probe packet 820 from network node 610(1) over an "Algo 128" network path.

The OAM-Disjoint-SID (161110) may be the last SID in the SID stack. Upon observing <161110> in the SID stack, network node 610(10) may determine that probe packet 820 should be replicated and provided (as a response) over first network path (an "Algo 128" network path) and a second network path (an "Algo 129" network path). Thus, as represented by arrow 830(1), in response to the OAM-Disjoint-SID, network node 610(10) may provide the first response over the "Algo 128" network path. The first response may include SID <161280> to cause the first response to take the "Algo 128" network path to network node 610(1). Network node 610(1) may thereby obtain the first response over the "Algo 128" network path. Further in response to the OAM-Disjoint-SID, as represented by arrow 830(2), in response to the OAM-Disjoint-SID, network node 610(10) may provide the second response over the "Algo 129" network path. The second response may include SID <161290> to cause the second response to take the "Algo 129" network path to network node 610(1). Network node 610(1) may thereby obtain the second response over the "Algo 129" network path.

In system 800, an OAM-Disjoint-SID may be advertised for each prefix. However, it will be appreciated that any suitable semantic alternative to the OAM-Disjoint-SID may be utilized. The semantic may instruct a responder to perform a lookup in the destination address of a probe packet to obtain the prefix SID for both algorithms/network paths associated with the prefix (e.g., Algo 128 and Algo 129). The semantic may further prompt the responder to replicate copies of the probe packet (as responses) with the relevant respective SIDs.

FIGS. 2-8 illustrate examples in which two responses are provided by the responder and obtained by the initiator. However, it will be appreciated that any suitable number of responses (e.g., greater than two) may be employed. In one example, the initiator may provide an indication of a number of respective responses for the responder to provide to the initiator over respective network paths (e.g., a maximum number of replicated copies of responses). The responder may obtain the indication and provide the respective responses over the respective network paths. The initiator may thereby obtain the respective responses. Thus, if the initiator indicates that the responder should provide, for example, three responses to the probe packet, the responder may provide three responses over three disjoint network paths to the initiator based on the indication.

This may be implemented in the control plane or in the data plane. In control plane implementation, the probe packet may include a TLV that indicates the count. For example, a TLV of probe packet 320 (FIG. 3) in the ICMP example or probe packet 420 (FIG. 4) in the S-BFD example may include an indication of a maximum number of replicated copies of the response. In the multi-plane context, the indicated number of response may be provided over respective planes. For example, dual-plane system 500 (FIG. 5) may accommodate two responses (one for the "blue" plane and one for the "green" plane), but more than two planes may be utilized to carry more than two responses, if requested by the initiator. For data plane implementation, any suitable number of network paths may be signaled in a forwarding table. For example, forwarding table 710 (FIG. 7) may be supplemented with additional network paths to accommodate additional responses, if requested. In the Flex Algo context (FIGS. 6 and 8), additional algorithms may be defined (e.g., Algo 130, Algo 131, etc.) to match a given number of responses.

Figure 9:
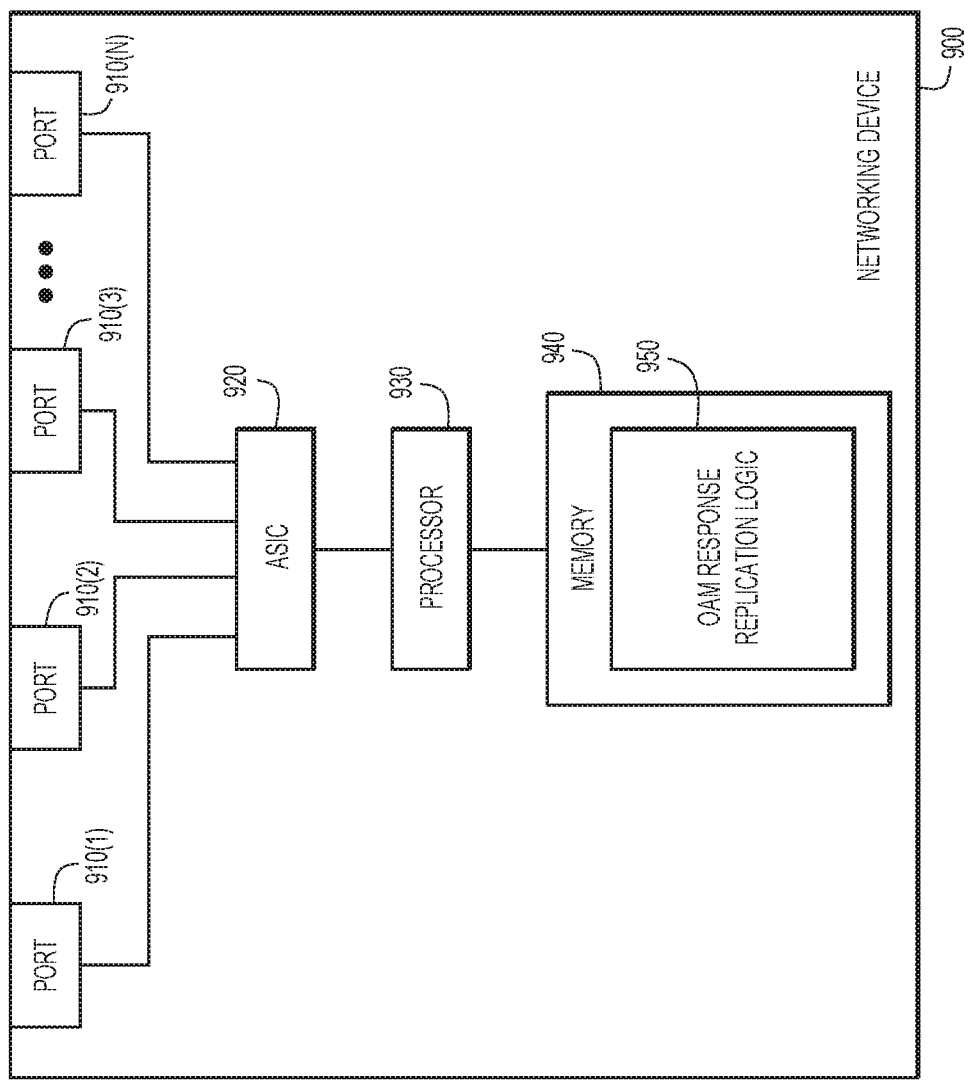
FIG. 9 illustrates a block diagram of a networking device configured for OAM response replication, according to an example embodiment.

FIG. 9 illustrates a block diagram of an example networking device 900 configured for OAM response replication. Networking device 900 may be, for example, network node 110(1), network node 110(6), leaf node 510(1), leaf node 510(2), network node 610(1), network node 610(10), etc. Networking device 900 includes a network interface (e.g., network interface unit) in the form of network ports 910(1)-910(N) that enable communications over a network, Application Specific Integrated Circuit (ASIC) 920 that performs network processing functions, one or more processors 930 (e.g., microprocessors or microcontrollers), and memory 940. Memory 940 includes OAM response replication logic 950, which may comprise OAM response replication logic 130 and/or OAM response replication logic 140(1).

Memory 940 may include read only memory (ROM), Random Access Memory (RAM), magnetic disk storage media devices, optical storage media devices, Flash memory devices, electrical, optical, or other physical/tangible memory storage devices. Thus, in general, memory 940 may comprise one or more tangible (non-transitory) computer readable storage media (e.g., a memory device) encoded with software comprising computer executable instructions and when the software is executed (e.g., by the one or more processors 930) it is operable to perform operations described herein.

Figure 10:
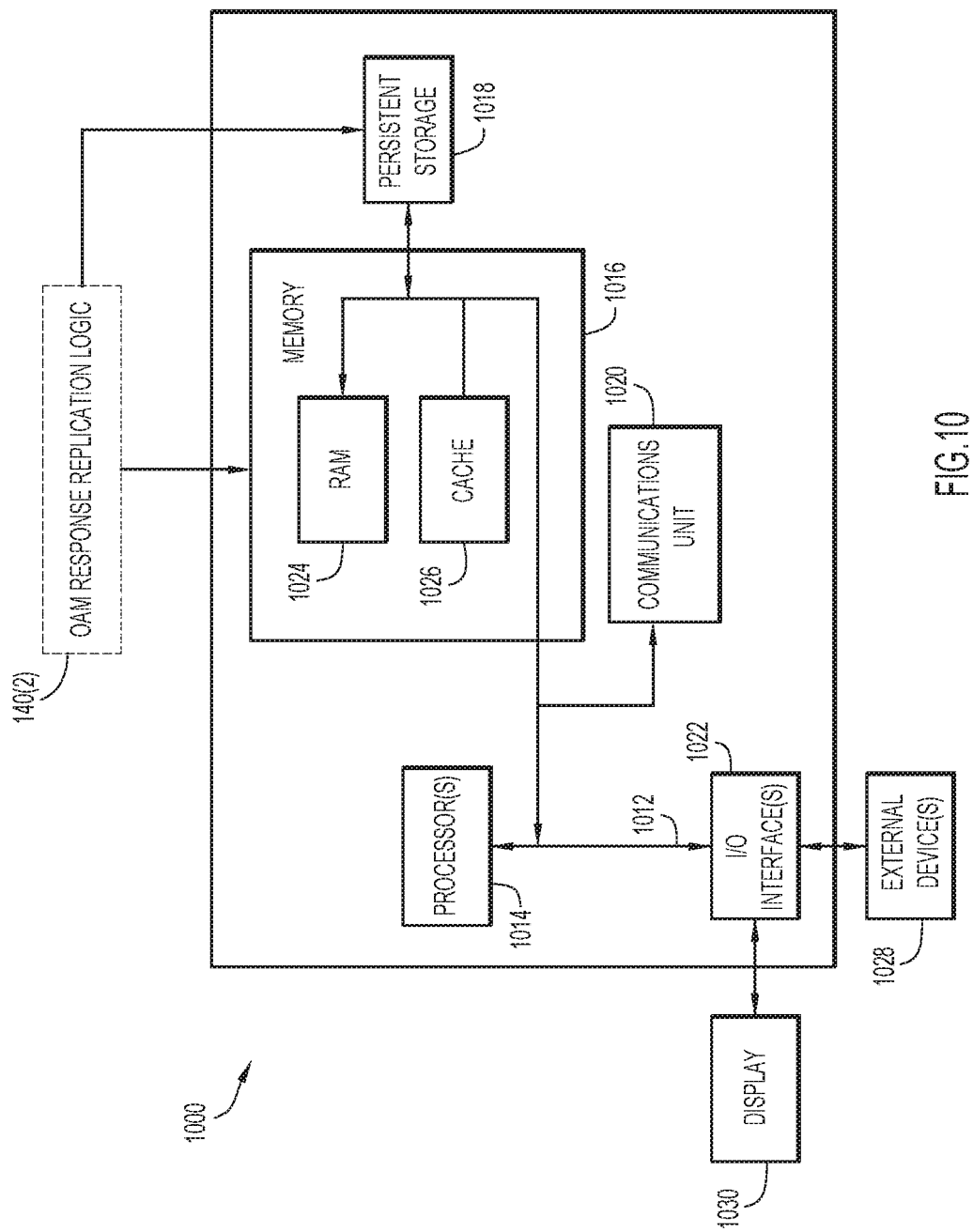
FIG. 10 illustrates a block diagram of a computing device configured for OAM response replication, according to an example embodiment.

FIG. 10 illustrates a block diagram of an example computing device 1000 (e.g., OAM server 120) configured for OAM response replication. It should be appreciated that FIG. 10 provides only an illustration of one embodiment and does not imply any limitations with regard to the environments in which different embodiments may be implemented. Many modifications to the depicted environment may be made.

As depicted, computing device 1000 includes bus 1012, which provides communications between computer processor(s) 1014, memory 1016, persistent storage 1018, communications unit 1020, and Input/Output (I/O) interface(s) 1022. Bus 1012 can be implemented with any architecture designed for passing data and/or control information between processors (such as microprocessors, communications and network processors, etc.), system memory, peripheral devices, and any other hardware components within a system. For example, bus 1012 can be implemented with one or more buses.

Memory 1016 and persistent storage 1018 are computer readable storage media. In the depicted embodiment, memory 1016 includes Random Access Memory (RAM) 1024 and cache memory 1026. In general, memory 1016 can include any suitable volatile or non-volatile computer readable storage media. Instructions for OAM response replication logic 140(2) may be stored in memory 1016 or persistent storage 1018 for execution by computer processor(s) 1014.

One or more programs may be stored in persistent storage 1018 for execution by one or more of the respective computer processors 1014 via one or more memories of memory 1016. The persistent storage 1018 may be a magnetic hard disk drive, a solid state hard drive, a semiconductor storage device, Read-Only Memory (ROM), Erasable Programmable ROM (EPROM), Flash memory, or any other computer readable storage media that is capable of storing program instructions or digital information.

The media used by persistent storage 1018 may also be removable. For example, a removable hard drive may be used for persistent storage 1018. Other examples include optical and magnetic disks, thumb drives, and smart cards that are inserted into a drive for transfer onto another computer readable storage medium that is also part of persistent storage 1018.

Communications unit 1020, in these examples, provides for communications with other data processing systems or devices. In these examples, communications unit 1020 includes one or more network interface cards. Communications unit 1020 may provide communications through the use of either or both physical and wireless communications links.

I/O interface(s) 1022 allows for input and output of data with other devices that may be connected to computing device 1000. For example, I/O interface(s) 1022 may provide a connection to external devices 1028 such as a keyboard, keypad, a touch screen, and/or some other suitable input device. External devices 1028 can also include portable computer readable storage media such as database systems, thumb drives, portable optical or magnetic disks, and memory cards.

Software and data used to practice embodiments can be stored on such portable computer readable storage media and can be loaded onto persistent storage 1018 via I/O interface(s) 1022. I/O interface(s) 1022 may also connect to a display 1030. Display 1030 provides a mechanism to display data to a user and may be, for example, a computer monitor.

Figure 11:
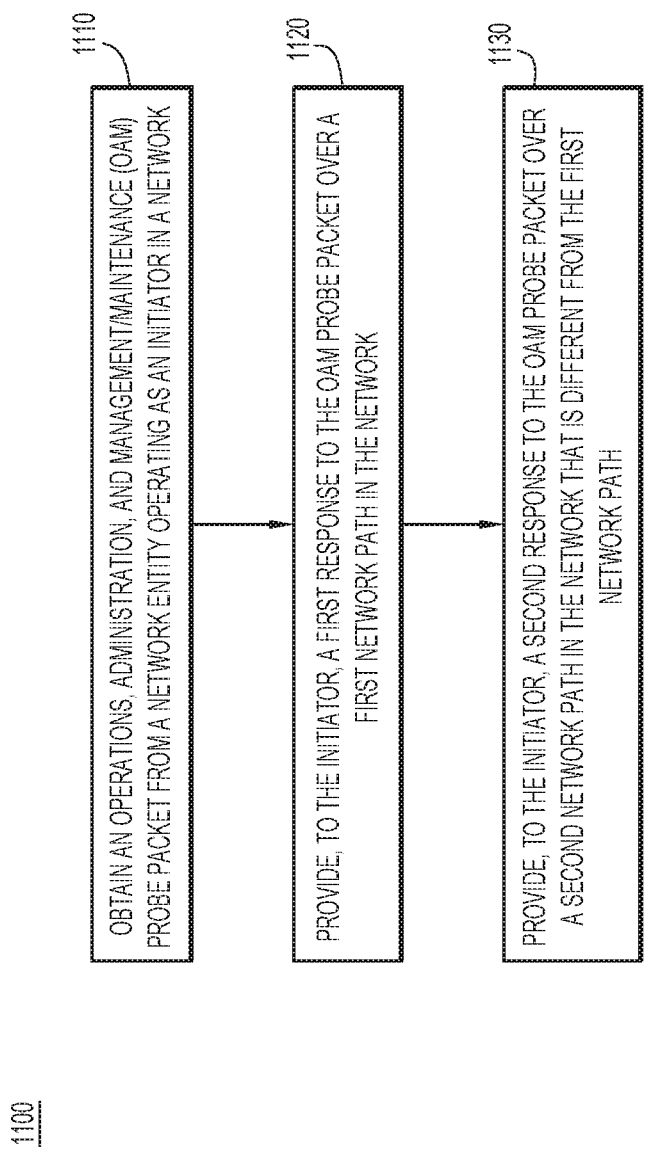
FIG. 11 illustrates a flowchart of a method for OAM response replication performed by a responder, according to an example embodiment.

FIG. 11 illustrates a flowchart of an example method 1100 for OAM response replication performed by a network entity (e.g., a network node) operating as a responder. At 1110, the responder obtains an OAM probe packet from a network entity operating as an initiator in a network. At 1120, the responder provides, to the initiator, a first response to the OAM probe packet over a first network path in the network. At 1130, the responder provides, to the initiator, a second response to the OAM probe packet over a second network path in the network that is different from the first network path.

Figure 12:
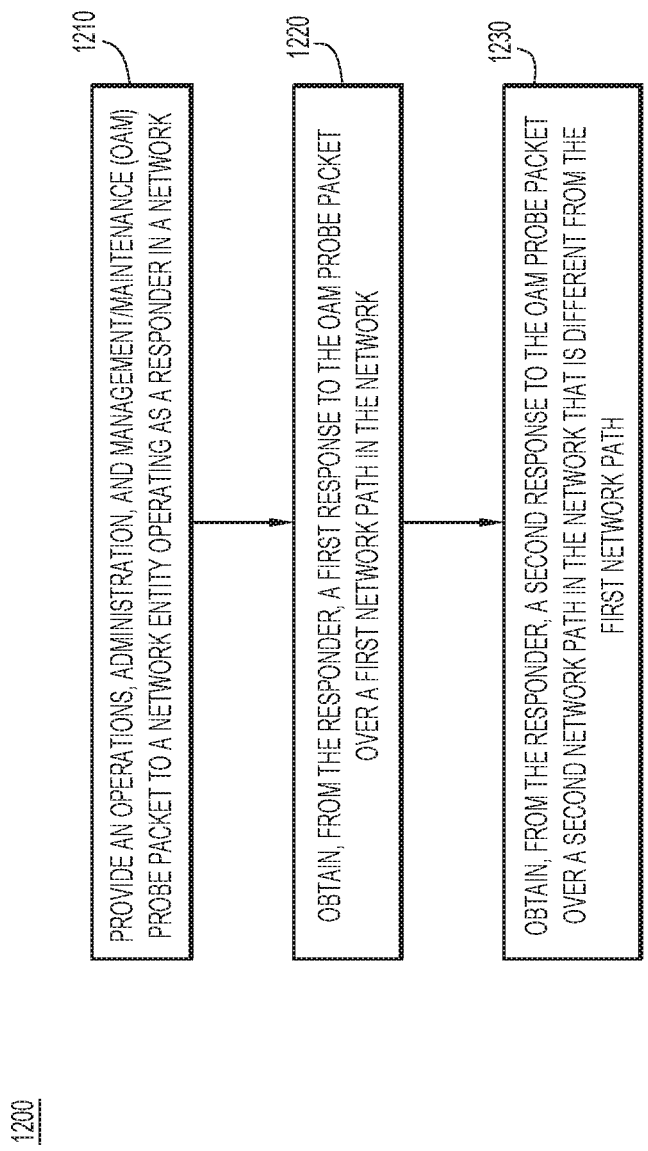
FIG. 12 illustrates a flowchart of a method for OAM response replication performed by an initiator, according to an example embodiment.

FIG. 12 illustrates a flowchart of an example method 1200 for OAM response replication performed by a network entity (e.g., a server or a network node) operating as an initiator. At 1210, the initiator provides an OAM probe packet to a network entity operating as a responder in a network. At 1220, the initiator obtains, from the responder, a first response to the OAM probe packet over a first network path in the network. At 1230, the initiator obtains, from the responder, a second response to the OAM probe packet over a second network path in the network that is different from the first network path.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, Compact Disc ROM (CD-ROM), Digital Versatile Disk (DVD), memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system.

Any combination of interfaces can be provided for elements described herein in order to facilitate operations as discussed for various embodiments described herein.

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, EPROM, Flash memory, a Static RAM (SRAM), a portable CD-ROM, a DVD, a memory stick, a floppy disk, a mechanically encoded device, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a LAN, a WAN, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, Instruction-Set-Architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In one form, a method is provided. The method comprises: obtaining an OAM probe packet from a network entity operating as an initiator in a network; providing, to the initiator, a first response to the OAM probe packet over a first network path in the network; and providing, to the initiator, a second response to the OAM probe packet over a second network path in the network that is different from the first network path.

In one example, each segment of the first network path before the initiator differs from each segment of the second network path before the initiator.

In one example, the method further comprises: obtaining an explicit indication to provide, to the initiator, the first response to the OAM probe packet and the second response to the OAM probe packet, wherein: providing the first response to the OAM probe packet over the first network path includes providing the first response to the OAM probe packet over the first network path in response to obtaining the explicit indication; and providing the second response to the OAM probe packet over the second network path includes providing the second response to the OAM probe packet over the second network path in response to obtaining the explicit indication.

In one example, the method further comprises: obtaining an identifier indicating that the OAM probe packet is destined for the initiator, wherein: providing the first response to the OAM probe packet over the first network path includes providing the first response to the OAM probe packet over the first network path in response to obtaining the identifier; and providing the second response to the OAM probe packet over the second network path includes providing the second response to the OAM probe packet over the second network path in response to obtaining the identifier.

In one example, providing the first response to the OAM probe packet over the first network path includes providing the first response to the OAM probe packet over a first plane of a multi-plane network; and providing the second response to the OAM probe packet over the second network path includes providing the second response to the OAM probe packet over a second plane of the multi-plane network.

In one example, providing the first response to the OAM probe packet over the first network path includes providing the first response to the OAM probe packet over the first network path based on a flexible algorithm; and providing the second response to the OAM probe packet over the second network path includes providing the second response to the OAM probe packet over the second network path based on the flexible algorithm.

In one example, obtaining an indication of a number of respective responses to the OAM probe packet to provide to the initiator over respective network paths; and providing the respective responses to the OAM probe packet over the respective network paths, including providing the first response to the OAM probe packet over the first network path and providing the second response to the OAM probe packet over the second network path.

In one example, obtaining the OAM probe packet, providing the first response to the OAM probe packet, and providing the second response to the OAM probe packet are performed by a network entity operating as a responder.

In another form, an apparatus is provided. The apparatus comprises: a network interface configured to obtain or provide network communications; and one or more processors coupled to the network interface, wherein the one or more processors are configured to: obtain an OAM probe packet from a network entity operating as an initiator in a network; provide, to the initiator, a first response to the OAM probe packet over a first network path in the network; and provide, to the initiator, a second response to the OAM probe packet over a second network path in the network that is different from the first network path.

In another form, one or more non-transitory computer readable storage media are provided. The non-transitory computer readable storage media are encoded with instructions that, when executed by a processor, cause the processor to: obtain an OAM probe packet from a network entity operating as an initiator in a network; provide, to the initiator, a first response to the OAM probe packet over a first network path in the network; and provide, to the initiator, a second response to the OAM probe packet over a second network path in the network that is different from the first network path.

In one form, another method is provided. The method comprises: providing an OAM probe packet to a network entity operating as a responder in a network; obtaining, from the responder, a first response to the OAM probe packet over a first network path in the network; and obtaining, from the responder, a second response to the OAM probe packet over a second network path in the network that is different from the first network path.

In one example, each segment of the first network path before an initiator differs from each segment of the second network path before the initiator.

In one example, the method further comprises: providing, to the responder, an explicit indication to provide the first response to the OAM probe packet and the second response to the OAM probe packet, wherein: obtaining the first response to the OAM probe packet over the first network path includes obtaining the first response to the OAM probe packet over the first network path in response to providing the explicit indication; and obtaining the second response to the OAM probe packet over the second network path includes obtaining the second response to the OAM probe packet over the second network path in response to providing the explicit indication.

In one example, the method further comprises: providing an identifier indicating that the OAM probe packet is destined for an initiator, wherein: obtaining the first response to the OAM probe packet over the first network path includes obtaining the first response to the OAM probe packet over the first network path in response to providing the identifier; and obtaining the second response to the OAM probe packet over the second network path includes obtaining the second response to the OAM probe packet over the second network path in response to providing the identifier.

In one example, obtaining the first response to the OAM probe packet over the first network path includes obtaining the first response to the OAM probe packet over a first plane of a multi-plane network; and obtaining the second response to the OAM probe packet over the second network path includes obtaining the second response to the OAM probe packet over a second plane of the multi-plane network.

In one example, obtaining the first response to the OAM probe packet over the first network path includes obtaining the first response to the OAM probe packet over the first network path based on a flexible algorithm; and obtaining the second response to the OAM probe packet over the second network path includes obtaining the second response to the OAM probe packet over the second network path based on the flexible algorithm.

In one example, the method further comprises: providing an indication of a number of respective responses to the OAM probe packet to provide to an initiator over respective network paths; and obtaining the respective responses to the OAM probe packet over the respective network paths, including obtaining the first response to the OAM probe packet over the first network path and obtaining the second response to the OAM probe packet over the second network path.

In one example, providing the OAM probe packet to the responder includes providing respective OAM probe packets over respective network paths to a network node before the responder.

In one example, providing the OAM probe packet, obtaining the first response to the OAM probe packet, and obtaining the second response to the OAM probe packet are performed by a network entity operating as an initiator.

In another form, another apparatus is provided. The apparatus comprises: a network interface configured to obtain or provide network communications; and one or more processors coupled to the network interface, wherein the one or more processors are configured to: provide an OAM probe packet to a network entity operating as a responder in a network; obtain, from the responder, a first response to the OAM probe packet over a first network path in the network; and obtain, from the responder, a second response to the OAM probe packet over a second network path in the network that is different from the first network path.

In another form, one or more other non-transitory computer readable storage media are provided. The non-transitory computer readable storage media are encoded with instructions that, when executed by a processor, cause the processor to: provide an OAM probe packet to a network entity operating as a responder in a network; obtain, from the responder, a first response to the OAM probe packet over a first network path in the network; and obtain, from the responder, a second response to the OAM probe packet over a second network path in the network that is different from the first network path.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining an Operations, Administration, and Management/Maintenance (OAM) probe packet from a network entity operating as an initiator in a fifth generation multi-slice network;
   obtaining an indication of a number of respective responses to the OAM probe packet to provide to the initiator over respective network paths; and
   providing, by a network entity operating as a responder, the respective responses to the OAM probe packet over the respective network paths, including providing, to the initiator, a first response to the OAM probe packet over a first network path of a first fifth generation network slice in the fifth generation multi-slice network, and providing, to the initiator, a second response to the OAM probe packet over a second network path of a second fifth generation network slice in the fifth generation multi-slice network that is different from the first network path.

2. The method of claim 1, wherein each segment of the first network path before the initiator differs from each segment of the second network path before the initiator.

3. The method of claim 1, further comprising:
   obtaining an explicit indication to provide, to the initiator, the first response to the OAM probe packet and the second response to the OAM probe packet, wherein:
   providing the first response to the OAM probe packet over the first network path includes providing the first response to the OAM probe packet over the first network path in response to obtaining the explicit indication; and
   providing the second response to the OAM probe packet over the second network path includes providing the second response to the OAM probe packet over the second network path in response to obtaining the explicit indication.

4. The method of claim 1, further comprising:
   obtaining an identifier indicating that the OAM probe packet is destined for the initiator, wherein:
   providing the first response to the OAM probe packet over the first network path includes providing the first response to the OAM probe packet over the first network path in response to obtaining the identifier; and
   providing the second response to the OAM probe packet over the second network path includes providing the second response to the OAM probe packet over the second network path in response to obtaining the identifier.

5. The method of claim 1, wherein:
   providing the first response to the OAM probe packet over the first network path includes providing the first response to the OAM probe packet over the first network path based on a flexible algorithm; and
   providing the second response to the OAM probe packet over the second network path includes providing the second response to the OAM probe packet over the second network path based on the flexible algorithm.

6. The method of claim 1, wherein obtaining the OAM probe packet and obtaining the indication of the number of respective responses are performed by the responder.

7. The method of claim 1, wherein:
   obtaining the OAM probe packet from the network entity operating as the initiator in the fifth generation multi-slice network includes obtaining the OAM probe packet from a leaf node in a first tier of the fifth generation multi-slice network;
   providing the first response over the first network path includes providing the first response to the leaf node in the first tier via a first middle node in a second tier of the fifth generation multi-slice network, a first spine node in a third tier of the fifth generation multi-slice network, and a second middle node in the second tier, wherein the first middle node, the first spine node, and the second middle node are part of the first fifth generation network slice; and
   providing the second response over the second network path includes providing the second response to the leaf node in the first tier via a third middle node in the second tier, a second spine node in the third tier, and a fourth middle node in the second tier, wherein the third middle node, the second spine node, and the fourth middle node are part of the second fifth generation network slice.

8. A method comprising:
providing an Operations, Administration, and Management/Maintenance (OAM) probe packet to a network entity operating as a responder in a fifth generation multi-slice network;
providing an indication of a number of respective responses to the OAM probe packet to provide to a network entity operating as an initiator over respective network paths; and
obtaining, from the responder, the respective responses to the OAM probe packet over the respective network paths, including obtaining, from the responder, a first response to the OAM probe packet over a first network path of a first fifth generation network slice in the fifth generation multi-slice network, and obtaining, from the responder, a second response to the OAM probe packet over a second network path of a second fifth generation network slice in the fifth generation multi-slice network that is different from the first network path.

9. The method of claim 8, wherein each segment of the first network path before the initiator differs from each segment of the second network path before the initiator.

10. The method of claim 8, further comprising:
providing, to the responder, an explicit indication to provide the first response to the OAM probe packet and the second response to the OAM probe packet, wherein:
obtaining the first response to the OAM probe packet over the first network path includes obtaining the first response to the OAM probe packet over the first network path in response to providing the explicit indication; and
obtaining the second response to the OAM probe packet over the second network path includes obtaining the second response to the OAM probe packet over the second network path in response to providing the explicit indication.

11. The method of claim 8, further comprising:
providing an identifier indicating that the OAM probe packet is destined for the initiator, wherein:
obtaining the first response to the OAM probe packet over the first network path includes obtaining the first response to the OAM probe packet over the first network path in response to providing the identifier; and
obtaining the second response to the OAM probe packet over the second network path includes obtaining the second response to the OAM probe packet over the second network path in response to providing the identifier.

12. The method of claim 8, wherein:
obtaining the first response to the OAM probe packet over the first network path includes obtaining the first response to the OAM probe packet over the first network path based on a flexible algorithm; and
obtaining the second response to the OAM probe packet over the second network path includes obtaining the second response to the OAM probe packet over the second network path based on the flexible algorithm.

13. The method of claim 8, wherein:
providing the OAM probe packet to the responder includes providing respective OAM probe packets over respective network paths to a network node before the responder.

14. The method of claim 8, wherein providing the OAM probe packet and providing the indication of the number of respective responses are performed by the initiator.

15. The method of claim 8, wherein:
providing the OAM probe packet to the network entity operating as the responder in the fifth generation multi-slice network includes providing the OAM probe packet to a leaf node in a first tier of the fifth generation multi-slice network;
obtaining the first response over the first network path includes obtaining the first response from the leaf node in the first tier via a first middle node in a second tier of the fifth generation multi-slice network, a first spine node in a third tier of the fifth generation multi-slice network, and a second middle node in the second tier, wherein the first middle node, the first spine node, and the second middle node are part of the first fifth generation network slice; and
obtaining the second response over the second network path includes obtaining the second response from the leaf node in the first tier via a third middle node in the second tier, a second spine node in the third tier, and a fourth middle node in the second tier, wherein the third middle node, the second spine node, and the fourth middle node are part of the second fifth generation network slice.

16. An apparatus comprising:
a network interface configured to obtain or provide network communications; and
one or more processors coupled to the network interface, wherein the one or more processors are configured to:
obtain an Operations, Administration, and Management/Maintenance (OAM) probe packet from network entity configured to operate as an initiator in a fifth generation multi-slice network;
obtain an indication of a number of respective responses to the OAM probe packet to provide to the initiator over respective network paths; and
provide, by a network entity operating as a responder, the respective responses to the OAM probe packet over the respective network paths, including providing, to the initiator, a first response to the OAM probe packet over a first network path of a first fifth generation network slice in the fifth generation multi-slice network, and providing, to the initiator, a second response to the OAM probe packet over a second network path of a second fifth generation network slice in the fifth generation multi-slice network that is different from the first network path.

17. The apparatus of claim 16, wherein the one or more processors are further configured to:
obtain an explicit indication to provide, to the initiator, the first response to the OAM probe packet and the second response to the OAM probe packet;
provide the first response to the OAM probe packet over the first network path in response to obtaining the explicit indication; and
provide the second response to the OAM probe packet over the second network path in response to obtaining the explicit indication.

18. The apparatus of claim 16, wherein the one or more processors are further configured to:

obtain an identifier indicating that the OAM probe packet is destined for the initiator;

provide the first response to the OAM probe packet over the first network path in response to obtaining the identifier; and provide the second response to the OAM probe packet over the second network path in response to obtaining the identifier.

19. The apparatus of claim 16, wherein each segment of the first network path before the initiator differs from each segment of the second network path before the initiator.

20. The apparatus of claim 16, wherein the one or more processors are configured to:

obtain the OAM probe packet from a leaf node in a first tier of the fifth generation multi-slice network;

provide the first response to the leaf node in the first tier via a first middle node in a second tier of the fifth generation multi-slice network, a first spine node in a third tier of the fifth generation multi-slice network, and a second middle node in the second tier, wherein the first middle node, the first spine node, and the second middle node are part of the first fifth generation network slice; and provide the second response to the leaf node in the first tier via a third middle node in the second tier, a second spine node in the third tier, and a fourth middle node in the second tier, wherein the third middle node, the second spine node, and the fourth middle node are part of the second fifth generation network slice.

* * * * *